Aug. 19, 1969  J. VAN INGEN  3,461,651
FILTER ARRANGEMENT
Filed June 28, 1967
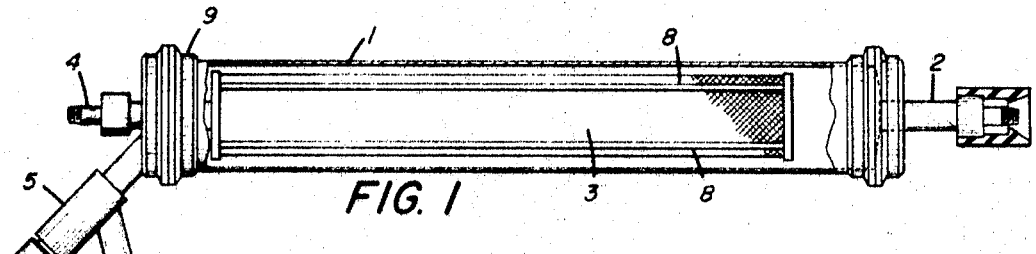
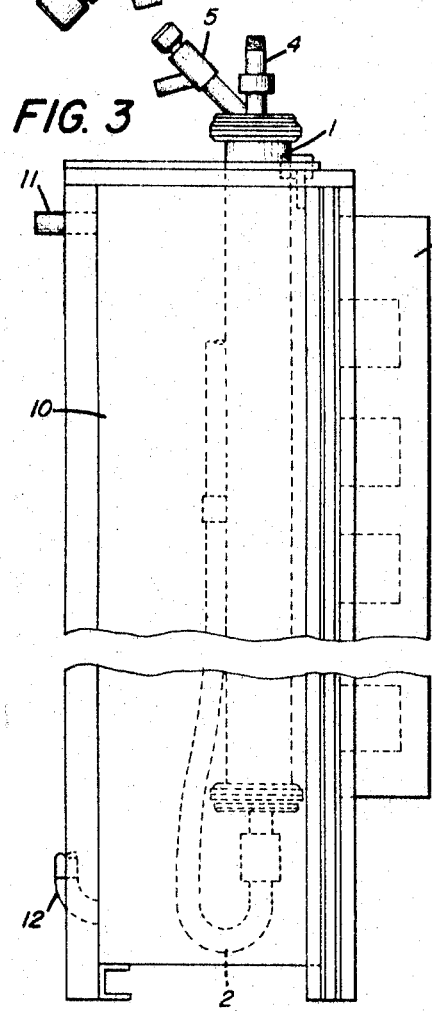
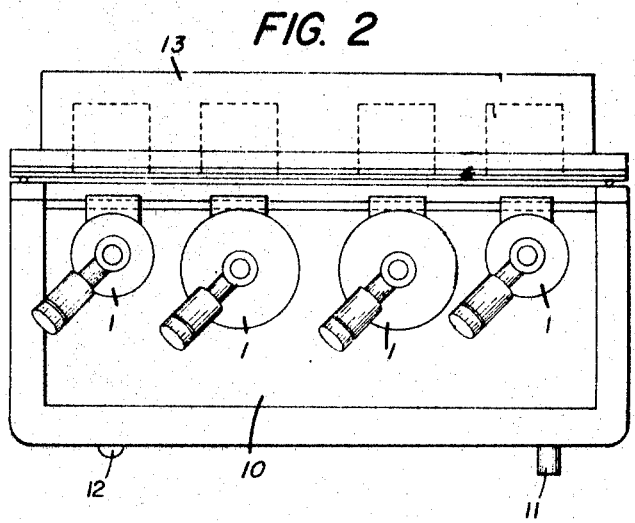
JACK A. VAN INGEN
INVENTOR.
BY R. Frank Smith
Scranton C. Van Houten
ATTORNEYS

United States Patent Office 3,461,651
Patented Aug. 19, 1969

3,461,651
FILTER ARRANGEMENT
Jack van Ingen, Rochester, N.Y., assignor to Eastman Kodak Company, Rochester, N.Y., a corporation of New Jersey
Continuation-in-part of application Ser. No. 522,175, Jan. 21, 1966. This application June 28, 1967, Ser. No. 652,649
Int. Cl. B01d *19/00*
U.S. Cl. 55—199                2 Claims

ABSTRACT OF THE DISCLOSURE

A filter which has ultrasonic vibrations transmitted to the filter screen to improve filtration.

This application is a continuation-in-part of my earlier copending application Ser. No. 522,175, filed Jan. 21, 1966, and now abandoned.

Background of the invention

This invention relates in general to the filtration of liquids and, more particularly, to a method of treating gelatinous dispersions or solutions, for example gelatin-silver halide photographic emulsions, to obtain uninterrupted filtering of said dispersions or solutions with fine mesh screens, to eliminate bubbles therefrom and to reduce the particle size of any undissolved gelatinous lumps therein.

The filtration of gelatinous solutions (dispersions) has involved forcing those solutions through screens which have had openings greater than 100 microns in size to enable the operation to continue for a practical length of time without clogging. Even in those cases, after a time generally varying from 1½ to 10 hours, back pressure builds up necessitating discontinuance of the operation and cleaning of the screen before filtration can be resumed. Ordinarily the filtrate obtained in that operation contains numerous bubbles of entrained air. Consequently, if this solution is to be used for coating operations for the manufacture of bubble-free coatings or films, deaeration will be needed. In the screening operations for gelatinous solutions in which a mesh size of less than 100 microns was used, back pressure has heretofore built up in such a short time that these operations may as well have been considered impractical.

One object of my invention is to provide a method of filtering liquids and eliminating bubbles therefrom in which both results are obtained in a single operation. Another object of my invention is to provide a method which both filters a gelatinous solution and eliminates bubbles in which the screening element does not clog and hence the operation may be continued for long periods of time without closing down. A further object of my invention is to provide a method of screening gelatinous solutions in which finer mesh screens can be employed than has been found to be possible in prior operations. A still further object of my invention is to provide a method of treating gelatinous solutions in which the particle size of any undissolved gel lumps therein is appreciably reduced. A still further object of my invention is to provide a method for treating gelatinous solutions in which those solutions are simultaneously subjected to screening and the effect of ultrasonic vibrations whereby those solutions are adapted for applying layers to supports or to other surfaces to provide smooth protective coatings thereon. Other objects of my invention will appear herein.

Summary of the invention

I have found that these and other objects are attained when gelatinous solutions are subjected to the combined effects of ultrasonic vibrations and screening simultaneously and at a temperature at which the gelatinous solution is readily flowable. This temperature is conveniently maintained by utilizing the heat imparted by the ultrasonic energy together with a water bath of substantially constant temperature circulating around the elements in which the invention is being carried out.

Brief description of the drawings

The accompanying drawings illustrate an apparatus in which processes in accordance with my invention may be conveniently carried out.

FIGURE 1 is a side elevation view partly in section of a filtering unit;

FIGURE 2 is a top view of a combination of apparatus in which a plurality of filter units are in position for operation simultaneously in carrying out the treatment of gelatinous dispersions in accordance with the invention; and FIGURE 3 is an end view of the combination of apparatus as illustrated in FIGURE 2.

Description of the preferred embodiment

In the drawings a filter unit illustrated by FIGURE 1 is composed of a cylindrical casing 1 provided at one end with a suitable outlet 2 which may be extended if desired by suitable connections and tubes or pipes. Inserted in the other end of the casing 1 is a filter element 3 composed of a solid top and bottom held by conecting rods 8 and a screen mesh cylinder. The filter element is also provided with a cap 9 which contains an inlet pipe 4 which enters the filter element, and a valved vent 5 which can be used to bleed off air or foam from the casing as required. The cap 9 is equipped with conventional means for capping the casing 1, such as by means of threads or some other suitable fastening device.

Referring to FIGURE 2, the apparatus illustrated there consists of several banks of sonic devices or transducers 13, such as magnetostrictive elements, piezo-electric crystals, lead zirconate transducers or the like physically attached to the metallic shell of water bath container 10. I have found an ultrasonic generator manufactured by the Branson Company is useful to propagate a 40,000 cycles per second signal when a 150 milliampere current is supplied to 20 matched frequency transducers.

Referring to FIGURE 2, a plurality of filtering units of the type illustrated in FIGURE 1 are interiorly attached to the wall of the metallic shell of the water bath container 10, to which the transducers are exteriorly attached. The filtering units illustrated here are two 3-inch diameter units, and two 2-inch diameter units.

FIGURE 3 illustrates the manner in which the filtering units are ordinarily employed, being in upright position in the water bath container 10. The outlet 2 of the filter unit includes an extension, illustrated in FIGURE 3 by a flexible tube, which can lead to a container (not shown) for collecting the filtered and debubbled gelatinous dispersion. The water bath container 10 is supplied with an inlet 11 and an outlet 12 to provide means for continuously circulating water at constant temperature through the water bath container. The gelatinous dispersion to be processed is supplied to the filtering unit 1 under pressure, such as 15–25 pounds per square inch, which pressure may be provided by passing the dispersion through a pump (not shown) prior to its introduction into the filtering unit.

The screen or mesh of filter element 3 can be of a size desired by the individual operator. Although screens of more than 100 microns mesh size as are conventional for filtering gelatinous solutions can be used, my invention makes it possible to use screens of a mesh size finer than 100 microns without clogging or building up of back pressure in the filtering operation.

Since it has been found that ultrasonic sound waves tend to travel in a straight line, and since they tend to be absorbed by the liquid through which they are passing, especially when very high viscosities are involved, it is necessary that the transducers 13 be arranged substantially coextensive with at least one surface of the filter element 3. For example, it has been found that should only one transducer be arranged to radiate sound waves toward the filter element, only that area of the filter immediately adjacent the transducer would remain free of clogging and the rest of the filter would plug, necessitating cleaning of the filter before operation could be continued. Moreover, it is necessary that the transducers be aimed at the filter element in order to achieve the results desired and that the intensity of the sound waves be sufficiently great as to cause the filter element itself to vibrate. Otherwise, it has been found that vibration of the liquid only, without vibration of the filter element, will not prevent the filter from plugging.

My invention involves the introduction of a liquid, such as a gelatinous solution, such as by pumping into a chamber at least part of the enclosure of which is a fine mesh screen and filtering the solution through that screen while the apparatus is subjected to the effect of ultrasonic vibrations (e.g. 10–100 kc. per sec.). For instance, the screen may conveniently be one having openings which are less than 100 microns. Screens having openings of a size as low as 17 microns have even been found to be useful in procedures in accordance with the invention. By carrying out the filtration of the gelatinous solution using the combination of fine mesh screen and ultrasonic vibration, results are obtained which are very advantageous. Some of the advantages obtained are as follows:

(1) Filter screen longevity is increased at least ten times.

(2) Undesirable increases in operating line pressures due to filter clogging are minimized.

(3) Periods of downtime or no production are greatly minimized.

(4) Finer filter screens with improved porosity retention characteristics may be employed resulting in improved physical and chemical quality of product.

(5) Considerable cost reduction in maintenance of filter screens and filter housings.

(6) Any relatively soft undissolved gelatin lumps are reduced in size.

(7) Potential solution by-passing of the existing filter screens due to excessive line pressure is eliminated.

In carrying out an operation in accordance with the invention, using apparatus as illustrated in FIGURE 3, the gelatinous solution is first pumped into the filter element 3, such as under pressure of 20–25 pounds per square inch, with the vent 5 in open condition to relieve air pressure and if necessary to allow any foam which forms to escape. In the meantime water at an elevated temperature, conveniently 90–120° F., is circulated through the vessel 10 and the transducers are set into operation. After the need for the vent 5 has passed, it is closed and the operation is carried out under pressure as supplied by the pressure of the gelatinous dispersion which enters the filter element. The presence of pressure aids in eliminating bubbles, the pressure seemingly assisting in dissolving of gas by the dispersion or in expelling of the bubbles therefrom. The filtrate obtained is free of suspended matter and bubbles and is in condition for use in coating operations.

The gelatinous dispersions usually processed are aqueous solutions of gelatin. Also included are gelatin solutions having in suspension therein finely divided materials, as illustrated by gelatin-silver halide photographic emulsions or baryta compositions, the latter being suspensions of finely divided barium sulfate in a gelatin solution. Also included in gelatinous dispersions are so-called solutions of polymeric materials classified as water soluble, such as aqueous solutions of alkali metal salts of polymers such as alkyl acrylate-acrylic acid, carboxy ester lactones, cellulose acetate phthalates, ethyl cellulose phthalates, or the like or polymers which are not salts such as polyvinyl alcohol, ether alone or mixed with gelatin.

The following example illustrates a procedure using my invention.

Example

An apparatus as illustrated by the drawings was used. The ultrasonic generator used was one manufactured by the Branson Company which propagates a 40,000 cycles per second signal when a 150 milliampere current is supplied to twenty matched frequency transducers. The filter unit was surrounded by a water bath, the temperature of which was maintained at about 97° F. by constant circulation of the water therethrough from a constant temperature water source. A 40 micron size mesh screen was used, the filter unit employed being that illustrated by FIGURE 1 of the drawings. Gelatin-silver halide photographic emulsion of standard type was pumped into the interior of the filter unit at a pressure of 20–25 pounds per square inch during which ultrasonic energy was supplied thereto and the run was continued for 24 hours. The filter was then withdrawn and was found to be free of any coarse particles. The bubbles had all been eliminated from the filtrate obtained. Due to the ultrasonic treatment being carried out under pressure any entrained air which had been present in the emulsion was in dissolved form or else had been expelled from the emulsion. The emulsion composition was in good condition for coating out onto a support, without any further treatment, by using a conventional coating procedure.

In the carrying out of procedures in accordance with my invention, it is desirable that the liquid/metal interfaces which are parallel to the face of the transducer be positioned at a distance from the transducer face which is an antinode thereby obtaining optimum efficiency. For instance, it is desirable in FIGURE 3 that the outside wall of the filtering unit be at an antinode distance from the wall of the tank upon which the transducer is located. These distances can be calculated by the velocity of sound and the vibration frequency. For example, with the velocity of sound through air-free water being 5000 feet per second at 35° C. and using a transducer frequency of 40 kc. per second, Wave length=

$$\frac{5{,}000 \text{ feet per second} \times 12 \text{ inches per foot}}{40{,}000 \text{ cycles per second}}$$

$$=1.50 \text{ inches per cycle}$$

As an antinode exists at the point of propagation of sound, other antinodes exist at every half wave length of the sound path prependicular to the face of the transducer. In accordance with the example, these points would occur at the following intervals: ¾, 1½, 2¼, 3, 3¾, 4½, 5¼, 6, 6¾, 7½, 8¼, 9 inches etc.

The following table shows the effect of distance from transducer plate on the air dissolving capacity of a filter unit of 2-inch diameter.

Effect of distance from the transducer plate on air dissolving capacity of a filter in a 2-inch diameter filter casing

| Distance from transducer plate to centerline of casing, inches: | Percentage of air that can be dissolved in 64 centipoise presaturated gel (at 4.25 lbs. per min. flow), percent |
| --- | --- |
| 2¹⁄₁₆ | 0.15 |
| 2½ | 0.15 |
| 4.0 | 0.046 |
| 7.0 | 0.019 |

The invention has been described in considerable detail with particular reference to certain preferred embodiment thereof, but it will be understood that variations and modifications can be effected within the spirit and scope of the invention as described hereinabove, and as defined in the appended claims.

I claim:
1. Apparatus for filtering and debubbling a liquid comprising a fluid-tight container, a cylindrical casing having a vertically extending longitudinal axis and disposed within said container, said casing having a liquid inlet and a gas outlet in an upper portion thereof and a liquid outlet in the lower portion thereof, a cylindrical perforate filtering member disposed coaxially within said casing with the interior of said filtering member communicating with said liquid inlet, a plurality of ultrasonic transducers on at least one outer surface of said container, said transducers being substantially vertically coextensive with the filtering member in said casing, said casing and said filtering member being spaced from said one outer surface of said container at an antinodal distance of the signal produced by the transducers, means for introducing a liquid into said inlet and withdrawing said liquid from said outlet, and means for energizing said transducers whereby said liquid is simultaneously filtered and debubbled.

2. Apparatus for filtering and debubbling a liquid comprising a fluid-tight container, a cylindrical casing having a vertically extending longitudinal axis and disposed within said container, said casing having a gas outlet in the upper portion thereof, said casing having liquid inlet means and liquid outlet means disposed in opposite end portions thereof, a cylindrical perforate filtering member disposed coaxially within said casing with the interior of said filtering member communicating with said liquid inlet means, a pluralty of ultrasonic transducers on at least one outer surface of said container, said transducers being substantially vertically coextensive with the filtering member in said casing, said casing and said filtering member being spaced from said one outer surface of said container at an antinodal distance of the signal produced by the transducers, means for introducing a liquid into said inlet means and withdrawing said liquid from said outlet means, and means for energizing said transducers whereby said liquid is simultaneously filtered and debubbled.

References Cited
UNITED STATES PATENTS

| | | | |
|---|---|---|---|
| 3,161,591 | 12/1964 | Petter et al. | 210—251 |
| 3,239,998 | 3/1966 | Carter et al. | 55—15 X |
| 3,292,790 | 12/1966 | Tuit et al. | 210—332 X |
| 3,305,481 | 2/1967 | Peterson | 210—19 |

REUBEN FRIEDMAN, Primary Examiner

JOHN ADEE, Assistant Examiner

U.S. Cl. X.R.

55—277